(12) United States Patent
Peddawad et al.

(10) Patent No.: US 11,017,137 B2
(45) Date of Patent: May 25, 2021

(54) EFFICIENT PROJECTION BASED ADJUSTMENT EVALUATION IN STATIC TIMING ANALYSIS OF INTEGRATED CIRCUITS

(71) Applicant: International Business Machines Corporation, Armonk, NY (US)

(72) Inventors: Chaitanya Ravindra Peddawad, Bangalore (IN); Jeffrey Hemmett, St. George, VT (US); Jason D. Morsey, Hopewell Junction, NY (US); Steven E. Washburn, Poughquag, NY (US); Peter Elmendorf, Poughkeepsie, NY (US); Debjit Sinha, Wappingers Falls, NY (US); Kerim Kalafala, Rhinebeck, NY (US)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 16/595,451

(22) Filed: Oct. 7, 2019

(65) Prior Publication Data

US 2021/0103637 A1 Apr. 8, 2021

(51) Int. Cl.
*G06F 30/33* (2020.01)
*G06F 30/327* (2020.01)
(Continued)

(52) U.S. Cl.
CPC .......... *G06F 30/327* (2020.01); *G06F 30/392* (2020.01); *G06F 2119/12* (2020.01)

(58) Field of Classification Search
CPC .. G06F 2119/12; G06F 30/3312; G06F 30/30; G06F 1/324; G06F 2111/08;
(Continued)

(56) References Cited

U.S. PATENT DOCUMENTS

| 7,428,716 B2 | 9/2008 | Visweswariah |
| 8,615,727 B2 | 12/2013 | Ghanta et al. |

(Continued)

FOREIGN PATENT DOCUMENTS

WO    WO2010126684 A2    11/2010

OTHER PUBLICATIONS

Li et al., Statistical Timing Analysis and Criticality Computation for Circuits with Post-Silicon Clock Tuning Elements, IEEE Transactions on Computer-Aided Design of Integrated Circuits and Systems 34, vol. 11, 2015, pp. 1784-1797 https://arxiv.org/pdf/1705.04986.pdf.

(Continued)

*Primary Examiner* — Binh C Tat
(74) *Attorney, Agent, or Firm* — Erik Johnson; Otterstedt, Wallace & Kammer, LLP

(57) ABSTRACT

The efficiency of electronic design automation is increased by building, as an electronic data structure, a timing graph characterizing a putative integrated circuit design; identifying at least one of an edge and a node in the timing graph that requires canonical timing adjustment; and electronically calculating a deterministic timing adjustment for each of a plurality of corner cases. Based on the calculated deterministic timing adjustment for each of the plurality of corner cases, the canonical timing adjustment is determined for the at least one of an edge and a node; the canonical timing adjustment is applied to the timing graph; and the timing graph is updated based on the application of the canonical timing adjustment.

15 Claims, 12 Drawing Sheets

(51) Int. Cl.
*G06F 30/392* (2020.01)
*G06F 119/12* (2020.01)

(58) Field of Classification Search
CPC .... G06F 2119/06; G06F 30/327; G06F 30/33;
G06F 30/36; G06F 1/163; G06F 3/00;
G06F 3/013; G06F 3/014; G06F 3/017;
G06F 16/27; G06F 19/3418; G06T 5/006;
G06T 5/009; H04N 5/357; H04N 9/73;
H04L 67/12; H04L 67/22; H04L 69/40;
B33Y 10/00
USPC .................................................. 716/100–109
See application file for complete search history.

(56) References Cited

U.S. PATENT DOCUMENTS

| | | | |
|---|---|---|---|
| 8,875,082 B1* | 10/2014 | Sircar | G06F 30/39 716/134 |
| 9,495,497 B1 | 11/2016 | Buck et al. | |
| 9,619,609 B1 | 4/2017 | Bickford et al. | |
| 9,754,062 B2 | 9/2017 | Kalafala et al. | |
| 9,754,069 B2 | 9/2017 | Wu et al. | |
| 10,169,501 B1 | 1/2019 | Kulshreshtha et al. | |
| 10,185,795 B1 | 1/2019 | Keller et al. | |
| 2009/0288051 A1 | 11/2009 | Hemmett et al. | |
| 2013/0111425 A1 | 5/2013 | Kumar et al. | |
| 2015/0242554 A1* | 8/2015 | Dreibelbis | G06F 30/3312 703/2 |
| 2015/0310151 A1* | 10/2015 | Hathaway | G06F 30/3312 716/108 |

OTHER PUBLICATIONS

Wilhelm et al., tmvtnorm: A package for the truncated multivariate normal distribution, sigma 2.2 (2010), 5 pages https://journal.r-project.org/archive/2010/RJ-2010-005/RJ-2010-005.pdf.

Koutroumbas et al., On the efficient estimation of the mean of multivariate truncated normal distributions, 2014, 21 pages https://arxiv.org/pdf/1307.0680.pdf.

* cited by examiner

EFFICIENT PROJECTION BASED ADJUSTMENT EVALUATION IN STATIC TIMING ANALYSIS OF INTEGRATED CIRCUITS

BACKGROUND

The present invention relates to the electrical, electronic, and computer arts, and more specifically, to semiconductor Electronic Design Automation (EDA) and the like.

EDA involves the use of software tools for designing electronic systems such as integrated circuits (ICs) and printed circuit boards. Generally, ICs have data signals and a clock; the data signal needs to reach a certain node at the correct time vis-a-vis the time when the corresponding clock cycles the device at that node. If the data signal does not arrive in time, the clock is too fast, or alternatively, the data signal is taking too long to propagate (path is too slow).

In conventional static timing analysis, scalar values are typically employed for timing quantities such as delay, slew, guard time, arrival time, required arrival time, slack, adjust, assert and the like. In statistical static timing analysis, however, there are typically distributions (e.g., Gaussian) for one or more of the aforementioned quantities (there can also be a mix of distributed and single-valued quantities).

Modern statistical timing analysis techniques typically require canonical timing adjustments to model variations over the process space encompassing the parameters that may include temperature of the circuit, input voltage, and various manufacturing parameters of an integrated circuit, often referred to as PVT space. The available data typically includes basic timing data from an SSTA (statistical static timing analysis) engine as well as canonical model data as used in the SSTA. However, complications can arise in mapping deterministic calculations to statistical calculations and/or in maintaining corner accuracy (i.e. obtaining the same solution as a deterministic solution in that corner).

SUMMARY

Principles of the invention provide techniques for efficient projection-based adjustment evaluation in static timing analysis of integrated circuits. In one aspect, an exemplary method for increasing the efficiency of electronic design automation includes building, as an electronic data structure, a timing graph characterizing a putative integrated circuit design; identifying at least one of an edge and a node in the timing graph that requires canonical timing adjustment; electronically calculating a deterministic timing adjustment for each of a plurality of corner cases; based on the calculated deterministic timing adjustment for each of the plurality of corner cases, determining the canonical timing adjustment for the at least one of an edge and a node; applying the canonical timing adjustment to the timing graph; and updating the timing graph based on the application of the canonical timing adjustment.

In another aspect, an exemplary computer includes a memory; and at least one processor, coupled to the memory, and operative to increase the efficiency of electronic design automation by: building, as an electronic data structure in the memory, a timing graph characterizing a putative integrated circuit design; identifying at least one of an edge and a node in the timing graph that requires canonical timing adjustment; calculating a deterministic timing adjustment for each of a plurality of corner cases; based on the calculated deterministic timing adjustment for each of the plurality of corner cases, determining the canonical timing adjustment for the at least one of an edge and a node; applying the canonical timing adjustment to the timing graph; and updating the timing graph based on the application of the canonical timing adjustment.

As used herein, "facilitating" an action includes performing the action, making the action easier, helping to carry the action out, or causing the action to be performed. Thus, by way of example and not limitation, instructions executing on one processor might facilitate an action carried out by instructions executing on a remote processor, by sending appropriate data or commands to cause or aid the action to be performed. For the avoidance of doubt, where an actor facilitates an action by other than performing the action, the action is nevertheless performed by some entity or combination of entities.

One or more embodiments of the invention or elements thereof can be implemented in the form of a computer program product including a computer readable storage medium with computer usable program code for performing the method steps indicated. Furthermore, one or more embodiments of the invention or elements thereof can be implemented in the form of a system (or apparatus) including a memory, and at least one processor that is coupled to the memory and operative to perform exemplary method steps. Yet further, in another aspect, one or more embodiments of the invention or elements thereof can be implemented in the form of means for carrying out one or more of the method steps described herein; the means can include (i) hardware module(s), (ii) software module(s) stored in a computer readable storage medium (or multiple such media) and implemented on a hardware processor, or (iii) a combination of (i) and (ii); any of (i)-(iii) implement the specific techniques set forth herein.

Techniques of the present invention can provide substantial beneficial technical effects. For example, one or more embodiments provide one or more of:

enhanced timing performance in an integrated circuit (IC) design;

reduced power consumption in an integrated circuit (IC) design;

ability to map deterministic calculations to statistical calculations in difficult cases such as heuristics and complex logic chains;

ability to maintain corner accuracy of timing adjustments in statistical timing analysis;

ability to propagate in a single SSTA run;

efficient storage;

can be used to enhance a variety of industry standard EDA tools;

improves timing accuracy and/or the effectiveness of timing adjustments;

improves runtime efficiency of static timing adjust processing;

more efficient performance of projection-based timing adjustments in static timing analysis (STA);

improved chip yield because of accurate canonical timing adjustment.

These and other features and advantages of the present invention will become apparent from the following detailed description of illustrative embodiments thereof, which is to be read in connection with the accompanying drawings.

DETAILED DESCRIPTION

Figure 1:
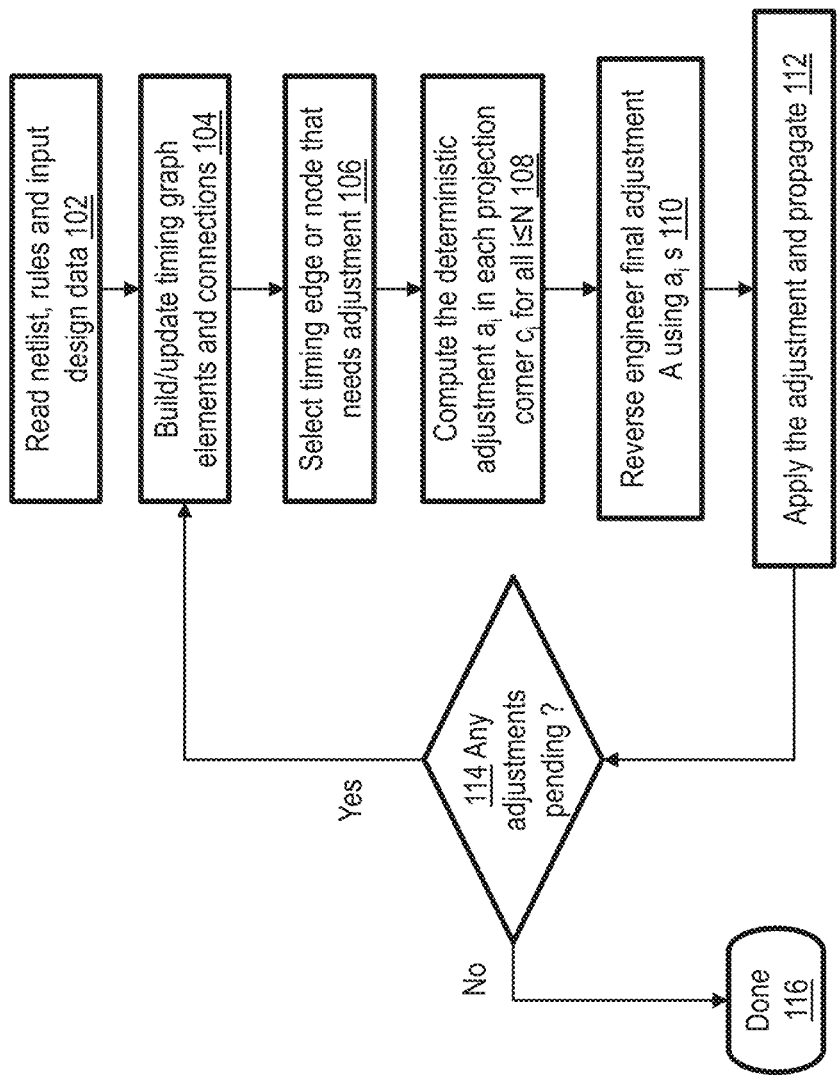
FIG. 1 is a flow chart of timing adjustment in accordance with one or more embodiments.

As noted, in conventional timing analysis, scalar values are typically employed for timing quantities such as delay, slew, guard time, arrival time, required arrival time, slack, adjust, assert and the like. In statistical timing analysis, however, there are typically distributions (e.g., Gaussian) for one or more of the aforementioned quantities (there can also be a mix of distributed and single-valued quantities). The distributions reflect, for example, chip operation at different voltages, different temperatures, different silicon process parameters, etc. A canonical representation is typically employed for the distributed parameters. Projecting the canonical refers to considering the appropriate range of parameters to cover all the relevant corner cases; e.g., high temperature high voltage, low temperature low voltage, low temperature high voltage, high temperature low voltage, and so on. The "corners" can be more than two-dimensional; for example, corner cases of silicon process parameters could also be included. In general, if there are two corners for each of N parameters, there will be a set of $2^N$ corners to which the canonicals can be projected. However, there are conditions where more than 2 corners may be desired, such as Dynamic Voltage Frequency Scaling, and differing parameters can have differing numbers of corners.

Consider a timing slack canonical, wherein it is desired to capture the worst possible value. The skilled artisan will typically be able to select, via experience, a subset of all the possible corners deemed to be of interest in a particular case, and project the canonical to that subset of corners, obtaining in each case a scalar value (or alternatively, projecting to all the possible corners and obtaining a scalar for each corner). The worst of these scalar values is then selected as the worst case.

Thus, the skilled artisan will appreciate that modern statistical timing analysis techniques typically require canonical timing adjustments to model variations over the process-voltage-temperature (PVT) and various manufacturing parameters space. The available data typically includes basic timing data from an SSTA (statistical static timing analysis) engine as well as canonical model data as used in the SSTA. However, complications can arise in mapping deterministic calculations to statistical calculations and/or in maintaining corner accuracy (i.e. obtaining the same solution as a deterministic solution in that corner). Regarding the former complication, some algorithms map cleanly from deterministic into statistical processing. These include, e.g., pure mathematical relations (add, sub, scale, max, min, etc.), e.g. pure common path pessimism removal (CPPR). Other algorithms, however, do not map at all: e.g., those employing heuristics and/or complex logic chains. Examples include Dynamic Timing Adjust (DTA) and slack stealing (many heuristics), noise adjusts (function of noise windows), etc. Regarding the latter complication, Statistical Max/Min does not always yield "corner accuracy." Statistical operations process Gaussian functions, not deterministic data. There is no 'corner' involved in the operation, all the inputs and outputs are Gaussian functions; the best fit is provided as an output Gaussian given a set of input Gaussians.

Furthermore, prior art techniques do not address derivation/application of timing adjustments in specific corner(s). In SSTA, all processing is statistical, operating on Gaussian functions. One or more embodiments advantageously provide a way to derive a canonical adjustment from corner adjustments so it can: be propagated in a single SSTA timing run; be efficiently stored (e.g. in abstracted models); and/or provide specific corner solutions/guarantee that canonical projections provide accurate corner results. Heretofore, prior art techniques have not guaranteed that statistical adjustments would match the same adjustments computed at a given corner. Indeed, direct statistical mathematic operations on canonical timing data are not currently practical in all the adjustment scenarios; e.g., slack cutoff, adjust cutoffs, limits, corner specific limits, etc. Furthermore, certain adjustments need uncommon math operations such as finding greatest common divisor (GCD) to find the minimum gap between two clock waveforms of arbitrary period, duty cycle, etc. Currently no math exists to perform these operations on canonical clock models.

One or more embodiments advantageously provide a hybrid statistical analysis with intermediate corner specific adjustment approach; e.g., using corner-specific plug-ins which assist in computing corner-specific accuracy while maintaining form factor (i.e. derived adjustments are canonical but maintain corner accuracy). Let D be the set of input timing data required to compute timing adjustment at a node/edge. D could contain timing canonicals (AT (arrival time)/RAT (required arrival time)/Slew (slew rate=change of voltage, current, or any other electrical quantity, per unit of time)/Slack (defined below)/Guard time/Delay etc.). D could contain a plurality of deterministic timing values across different corners in a given parameter space; e.g., coming from a plurality of deterministic solutions in some set of the above corners. D could contain a mix of the above two (some timing data canonical, some corner specific). Let A be the adjustment canonical to be derived with a desired resolution in variability. It is possible to have a pre-defined parameter space, i.e., no. of parameters to which sensitivity is needed. The default could be the full parameter space, the same as that of D. Let U be the set of unknowns in the canonical equation; will typically be: mean, no. of sensitivities of each parameter, and at what level each parameter is modelled (linear, quadratic etc.). For example, for a dynamic voltage and frequency scaling (DVFS) flow with voltage as the sole parameter with quadratic modeling, the unknowns would be three: mean, linear sensitivity, and quadratic sensitivity. Let C be the set of corners defined in parameter space with cardinality≥|U|.

Consider the following linear canonical equation:

$$A = u_1 + \sum_{i=2}^{n} u_i \Delta X_i;$$

A=any timing quantity in canonical form;
$u_1$=mean;
$u_i$=sensitivities to corresponding parameters $\Delta X_i$.

In one or more embodiments, for each $c_i \in C$ where $1 \leq i \leq N$, obtain $D_i$ by projecting every element of D to $c_i$ and compute a deterministic adjustment $a_i$ using $D_i$, using techniques known to the skilled artisan. For example, a cycle stealing adjust is computed by using scalar slack values on latch output and input from $D_i$. As known in the prior art, one of the typical embodiments of cycle stealing would derive adjustment based on the difference between aforementioned slacks, that is, based on the amount of imbalance present between the previous cycle and the next cycle slack on the latch. Next, reverse-engineer A by solving for the unknows $u_i$ from U using the $a_i$ values computed above ($1 \leq i \leq N$). This is typically a simple linear equation solution, as there are at least |U| equations to solve for |U| unknowns. For purely exemplary purposes, −3, 3 are the sampling sigma values of the parameters $X_2$, $X_3$ from the respective corner definition(s) C1, and so on.

$a_1 = 10 = u_1 + u_2*(-3) + u_3*(3)$      (corner C1)

$a_2 = 15 = u_1 + u_2*(3) + u_3*(3)$      (corner C2)

$a_3 = 05 = u_1 + u_2*(3) + u_3*(-3)$      (corner C3)

Solving these 3 equations for 3 unknowns, derive $A \rightarrow A = 7.5 + 0.83*\Delta X_2 + 1.66*\Delta X_3$.

Once A is obtained, it can be projected back to any desired corner. In SSTA, add or subtract A from appropriate timing data at the node/edge and propagate the timing. In a deterministic run at a corner $c_\#$, obtain the $a_\#$ number by projecting A to $c_\#$. Apply $a_\#$ in the timing graph for the propagated timing to correctly reflect the adjustment. Thus, a unique representation of adjustment A is derived using the method above to be used in an STA (static timing analysis) run.

Aspects of this process are depicted in the flow chart of FIG. 1. In step 102, read the netlist, rules and input design data. In step 104, build the timing graph elements and connections (first time through the flow) or update the timing graph elements and connections (subsequent times through the flow), as the case may be. In step 106, select the timing edge or node that needs adjustment (e.g., pick the transparent latches to perform a cycle stealing adjustment; pick the set-up and hold tests to perform Common Path Pessimism Removal (CPPR); and the like). In step 108, compute the deterministic adjustment $a_i$ in each projection corner $c_i$ for all $i \leq N$. In step 110, reverse engineer the final adjustment A using the $a_1$ values. In step 112, apply the adjustment and propagate. In decision block 114, determine whether any adjustments are pending. If not (NO branch), the process is finished for the time being as per terminator 116. Otherwise (YES branch), proceed back to step 104.

Figure 2:
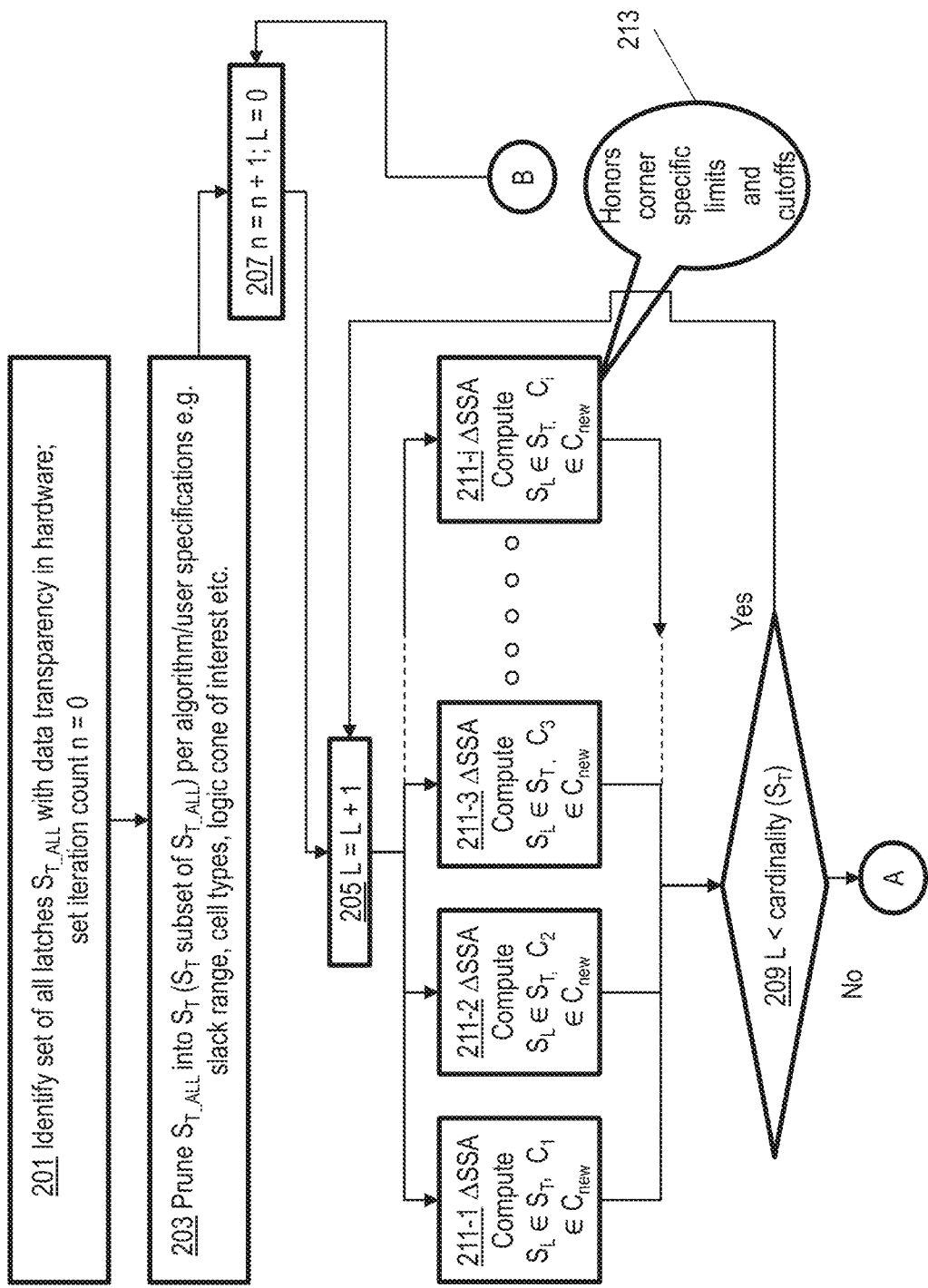
FIGS. 2, 3, and 4 are flow charts illustrating timing adjustment applied to a slack stealing engine (SSE), in accordance with one or more embodiments.
Figure 3:
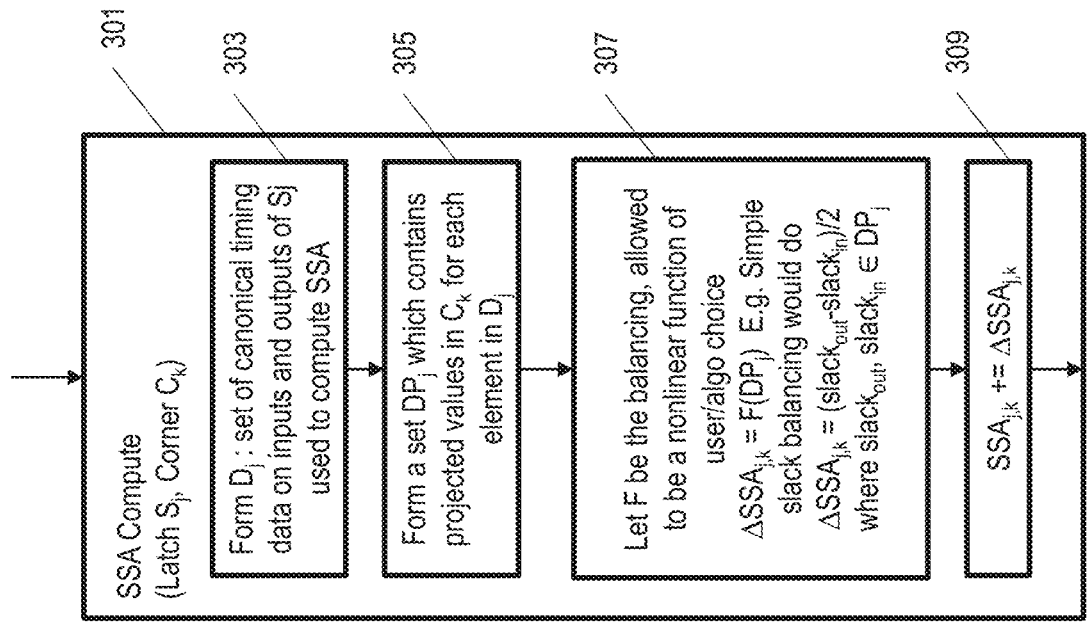
Figure 4:
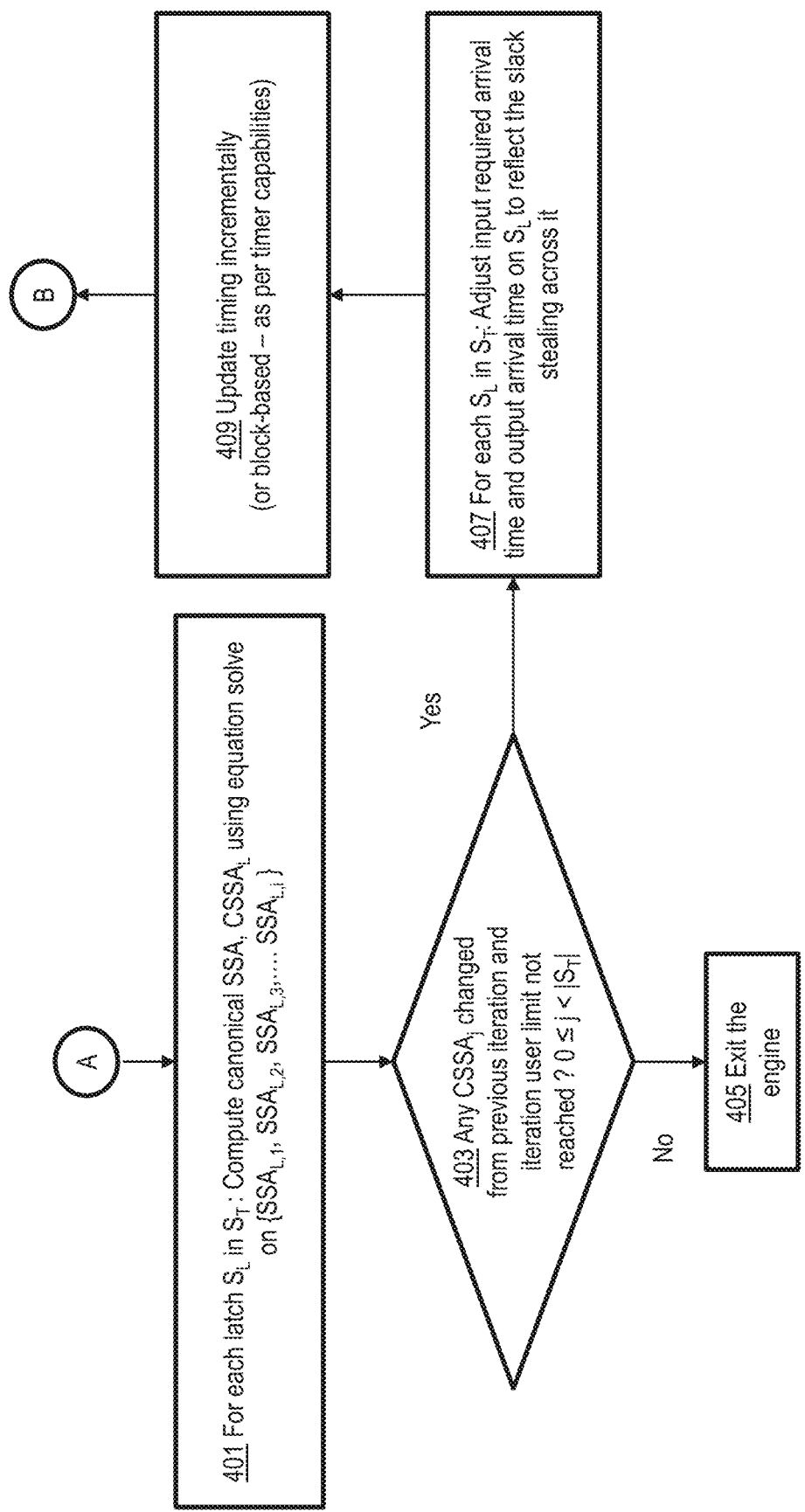

The flow charts of FIGS. 2, 3, and 4 show a first non-limiting exemplary specific application; namely, a slack stealing engine. As noted above, ICs have data signals and a clock; the data signal needs to reach a certain node at the correct time vis-a-vis the time when the corresponding clock cycles the device at that node. "Slack" refers to the margin between the data signal and the clock signal; if the data signal arrives with time to spare, there is positive slack; if the data signal arrives just in time, there is zero slack; and if the data signal arrives too late, there is negative slack. High performance chip designs are typically constrained to achieve certain timing goals (positive slack). Among the chip components, two types of storage elements include non-transparent latches (e.g., flip-flops) and transparent latches. Unlike edge-triggered non-transparent latches, transparent latches are able to transmit data during the period when the clock is active (referred to as the transparent window). During static timing analysis, which is used to verify the timing correctness of digital integrated circuits, transparent latches are often analyzed by assuming a discrete cycle boundary within the active clock interval by which a stable value will propagate to the latch output. "Slack stealing," also referred to as "slack balancing," "slack borrowing," "slack adjustment," "cycle stealing," "cycle boundary adjustment," and the like, refers to a technique wherein paths are adjusted to "steal" excess slack from a path with positive slack and provide it to a path that has negative slack or an inadequate margin (balancing across latches). Path adjustment is essentially achieved by adjusting the cycle boundary of the aforementioned transparent window which directly contributes to data path slack calculations.

With specific reference to FIG. 2, in step 201, identify the set of all latches $S_{T\_ALL}$ with data transparency in hardware, and also set the iteration count n=0. In step 203, prune $S_{T\_ALL}$ into $S_T$ (where $S_T$ is a subset of $S_{T\_ALL}$) per algorithm/user specifications e.g. slack range, cell types, logic cone of interest etc. In step 207, increment n by one and initialize L=0. In step 205, increment L by one. In steps 211-1, 211-2, 211-3, ..., 211-$i$, carry out computations for the corners $c_1, c_2, c_3, \ldots, c_i$, respectively, as will be discussed further below. In decision block 209, determine whether the current value of L is less than the cardinality of the subset $S_T$. If YES, increment L at step 205 and continue. If NO, proceed via connector A to FIG. 4. As indicated at 213, the calculations 211-1, 211-2, 211-3, ..., 211-$i$, honor corner-specific limits and cutoffs.

In FIG. 4, proceeding from connector A, in step 401, for each latch $S_L$ in $S_T$, compute $CSSA_L$ the canonical slack stealing adjustment (CSSA), using an equation solver on $\{SSA_{L,1}, SSA_{L,2}, SSA_{L,3}, \ldots, SSAL_{,i}\}$. In decision block 403, determine whether any $CSSA_j$ has changed from the previous iteration and whether the iteration user limit has not been reached (i.e. $0 \leq j < |S_T|$). If decision block 403 yields a NO, exit the engine at 405. Otherwise (YES branch), proceed to step 407. In step 407, for each $S_L$ in $S_T$, adjust the input required arrival time and output arrival time on $S_L$ to reflect the slack stealing across it. Then, proceed to step 409 and update the timing incrementally (or block-based—as per the timer's capabilities). Return to FIG. 2 via connector B and proceed to step 207.

FIG. 3 provides exemplary details 301 of the calculations 211-1, 211-2, 211-3, ..., 211-$i$; in particular, the SSA computation for latch $S_j$, corner $C_k$. In step 303, form $D_j$, a set of canonical timing data, on inputs and outputs of $S_j$ used to compute SSA. In step 305, form a set $DP_j$ which contains projected values in $C_k$ for each element in $D_j$. In step 307, let F be the balancing function, which is allowed to be a nonlinear function of user/algorithm ("algo") choice:

$$\Delta SSA_{j,k} = F(DP_j)$$

In some instances, simple slack balancing is appropriate:

$$\Delta SSA_{j,k} = (slack_{out} - slack_{in})/2$$

where $slack_{out}$, $slack_{in} \in DP_j$.

In step 309, $SSA_{j,k} += \Delta SSA_{j,k}$. ("+=" represents increment; that is to say, increment $SSA_{j,k}$ by $\Delta SSA_{j,k}$.)

Another non-limiting exemplary application involves canonical clocks and DTA adjust for tests and flush propagation (data flushing through transparent latches through a combinational timing arc). The goal in one or more embodiments is to calculate a canonical adjustment based on the canonical clocks, for use, for example, in the statistical timing algorithm. In one or more embodiments, capture the adjustment sensitivity to the various corner parameters (such as supply voltage, VDD). The deterministic clock adjustment calculation leverages concepts such as GCD (Greatest Common Divisor), which does not translate well to the mathematics of canonical representations. Thus, one or more embodiments sample the adjustment values at the various corners computed deterministically, and reverse engineer a canonical adjustment using the scalar adjustments in plurality of corners—a final adjustment. This approach generalizes to N corner parameters. The flush adjustment is computed in a similar fashion, which is a function of the clock definition.

Furthermore in this regard, corner clocks are typically defined using a tuple of {period, duty cycle, waveform}. There is typically one such tuple defined for each corner. Each corner also has a statistical sigma associated with it. There may be more than one corner parameter, in which case each parameter has a set of tuples, and a sigma, in each corner. In one or more embodiments, reverse engineering to derive canonical adjustment is applied as indicated in the following pseudo code:

For each corner {
Calculate the deterministic adjustment in that corner
Collect these deterministic values
}
Back-construct a canonical representation using all the scalar adjustments thus computed.

Still another non-limiting exemplary application involves determination of noise impact on timing. Coupled noise on a chip is when unwanted energy is transferred from one net (connection between two or more pins) to another net by means of coupled electric/magnetic fields. The net which is receiving the unwanted energy is commonly labeled the victim net, while the net(s) transmitting the unwanted energy are commonly labeled the aggressor net(s). The coupled noise is typically represented as a voltage signal (or multiple signals if there are multiple aggressors) existing on the victim net in addition to the desired/intended signal which was generated by the victim driver. The combination of the victim signal and the aggressor signal(s) represents the total voltage signal on the victim net as seen by the devices connected to the end of the net. An example of a noise adjust computation starts with a circuit simulation for a single victim net, from a single aggressor net, at corner $C_i$. Obtain the projected value $D_i$ of aggressor slew at the individual corner $C_i$. Solve the circuit for the aggressor noise. Repeat for each aggressor. Take noise values for each aggressor and perform a window analysis to obtain combined noise from all aggressors at corner $C_i$. Obtain projected values $D_i$ for victim and aggressor arrival times, required arrival times, and slews at $C_i$. Use projected values to build timing windows to obtain combined aggressor noise. Convert the combined noise value into an adjustment for delay and/or an adjustment for slew at corner $C_i$. Repeat for each corner $c_i \in C$. Build a canonical adjustment by solving for a canonical that fits the above per-corner values.

Figure 5:
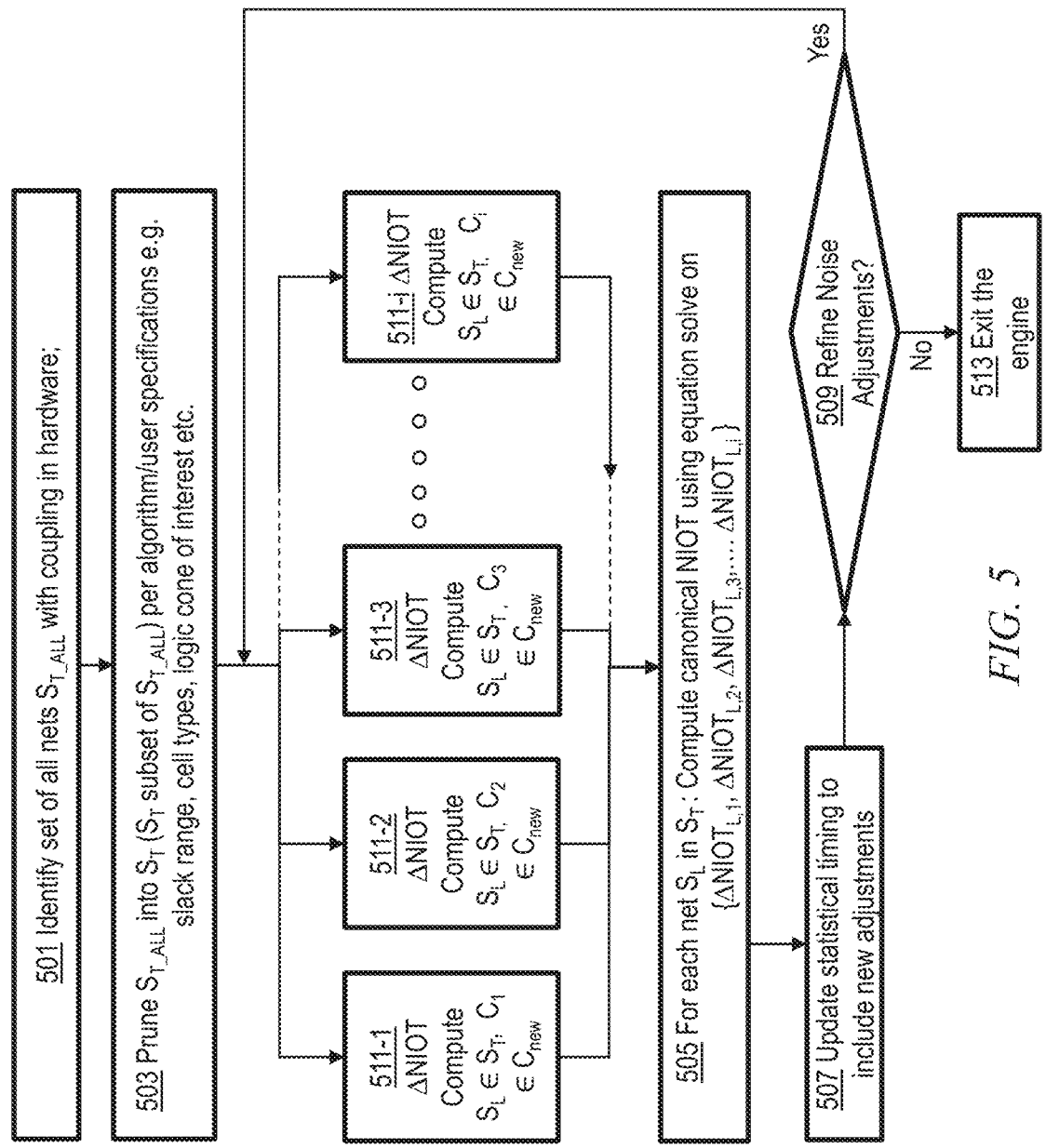
FIGS. 5 and 6 are flow charts illustrating timing adjustment applied to a noise adjustment scenario, in accordance with one or more embodiments.
Figure 6:
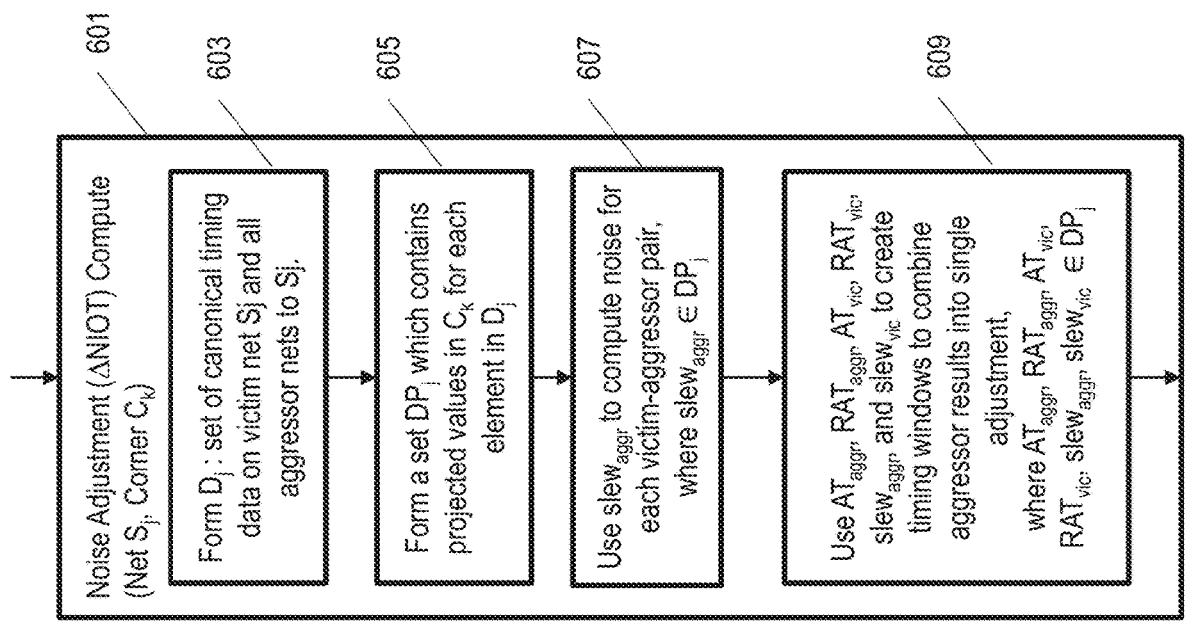

Yet a further non-limiting exemplary application relates to noise adjustments. Referring to FIGS. 5 and 6, in step 501, identify the set of all nets $S_{T\_ALL}$ with coupling in hardware. In step 503, prune $S_{T\_ALL}$ into $S_T$ ($S_T$ subset of $S_{T\_ALL}$) per algorithm/user specifications; e.g., slack range, cell types, logic cone of interest, etc. In steps 511-1, 511-2, 511-3, ..., 511-$i$, carry out computations for the corners $c_1$, $c_2$, $c_3$, ..., $c_i$, respectively, as will be discussed further below. In step 505, for each net $S_L$ in $S_T$, compute the canonical NIOT (Noise Impact on Timing) adjust using any known equation solving technique on $\{\Delta NIOT_{L,1}, \Delta NIOT_{L,2}, \Delta NIOT_{L,3}, ..., \Delta NIOT_{L,i}\}$ (given the teachings herein, the skilled artisan can select known techniques to solve the equations). In step 507, update the statistical timing to include new adjustments. In decision block 509, determine whether noise adjustments are to be refined. If so (YES branch), return to steps 511-1, 511-2, 511-3, ..., 511-$i$. If not (NO branch), exit the engine at 513.

FIG. 6 provides exemplary details 601 of the calculations 511-1, 511-2, 511-3, ..., 511-$i$; in particular, the noise adjustment ($\Delta NIOT$) computation (net $S_j$, corner $C_k$). In step 603, form $D_j$, the set of canonical timing data on victim net Sj and all aggressor nets to Sj. In step 605, form a set $DP_j$ which contains projected values in $C_k$ for each element in $D_j$. In step 607, use $slew_{aggr}$ to compute the noise for each victim-aggressor pair, where $slew_{aggr} \in DP_j$. In step 609, use $AT_{aggr}$, $RAT_{aggr}$, $AT_{vic}$, $RAT_{vic}$, $slew_{aggr}$, and $slew_{vic}$ to create timing windows to combine aggressor results into single adjustment, where $AT_{aggr}$, $RAT_{aggr}$, $AT_{vic}$, $RAT_{vic}$, $slew_{aggr}$, $slew_{vic} \in DP_j$.

An even further non-limiting exemplary application includes assertion generation for sub-blocks. During timing analysis at a parent level of hierarchy (design with sub-blocks/child-blocks), port assertions are generated for the sub-blocks. Multiple instances of a sub-block "type" require choosing an instance for the assertion generation (the level of granularity can be at the level of port, block, or even edge/mode for a port). Some instances include slack apportionment for a chosen instance of a sub-block. Different instances may be chosen for different corners. One or more embodiments generate an assertion for at least one port of at least one sub-block type at corner $C_i$ as follows: obtain at least one of projected arrival time, slew, and slack at corner $C_i$ for instances of the sub block at the port; choose an instance with the worst projected time, optionally perform apportionment, and capture the final assertion for $C_i$. Repeat for each corner to capture the assertion at each corner. Build a canonical assertion by solving for a canonical that fits the above per-corner values.

Thus, one or more embodiments provide techniques for deriving a timing adjustment in canonical form using corner-specific input data and a mathematical solver on per-corner independent deterministic computations, while preserving the accuracy of the corner solution(s) from each desired corner through the final representative adjustment.

In some instances, the canonical adjustment and/or the underlying deterministic adjustments are derived separately for each transition (i.e. data rise and data fall)—e.g., computed by using appropriate transition-specific quantities from "D."

In some instances, the canonical adjustment and/or underlying deterministic adjustments are derived on a per-phase basis.

In one or more embodiments, the canonical arrival times, required arrival times, and slews are projected to one or more process corners and used to perform noise analysis at those one or more process corners. The results from all corners are combined to form a canonical delay adjustment and/or a canonical slew adjustment.

In one or more embodiments, the canonical arrival times, required arrival times, slews, and slacks are projected to one or more process corners and used to perform sub-block assertion generation at those one or more process corners. The results from all corners are combined to form a canonical assertion.

Figure 7:
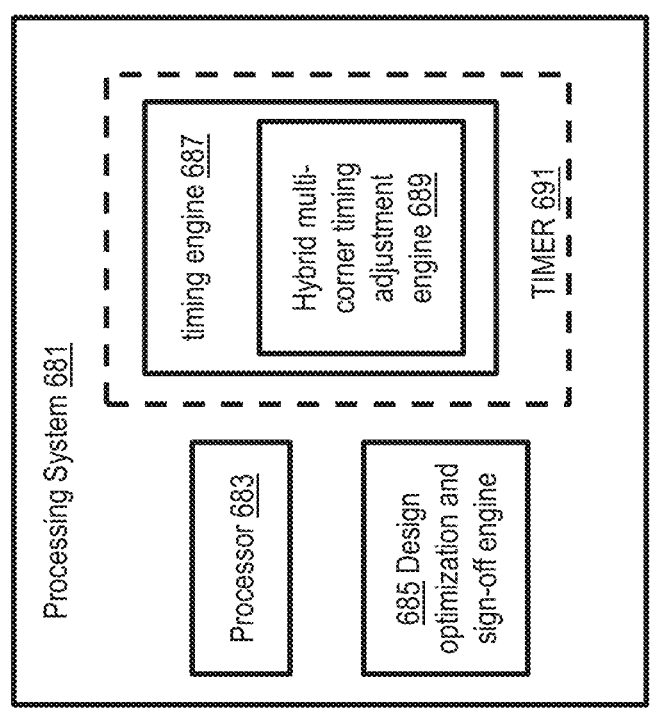
FIG. 7 is system block diagram, in accordance with one or more embodiments.

FIG. 7 shows an exemplary processing system 681 including one or more hardware processors 683 (see, e.g., discussion of element 16 in FIG. 9 below) with appropriate software. Timer 691 includes a timing engine 687 with a hybrid multi-corner timing adjustment engine 689. Also included is a design optimization and sign-off engine 685. Given the teachings herein, the skilled artisan will be able to implement the hybrid multi-corner timing adjustment engine 689 and interface same with the other components in FIG. 7, which can be implemented using known, commercially available software and hardware. In essence, in one or more embodiments, the hybrid multi-corner timing adjustment engine 689 takes the place of a prior-art deterministic adjustment engine.

Figure 8:
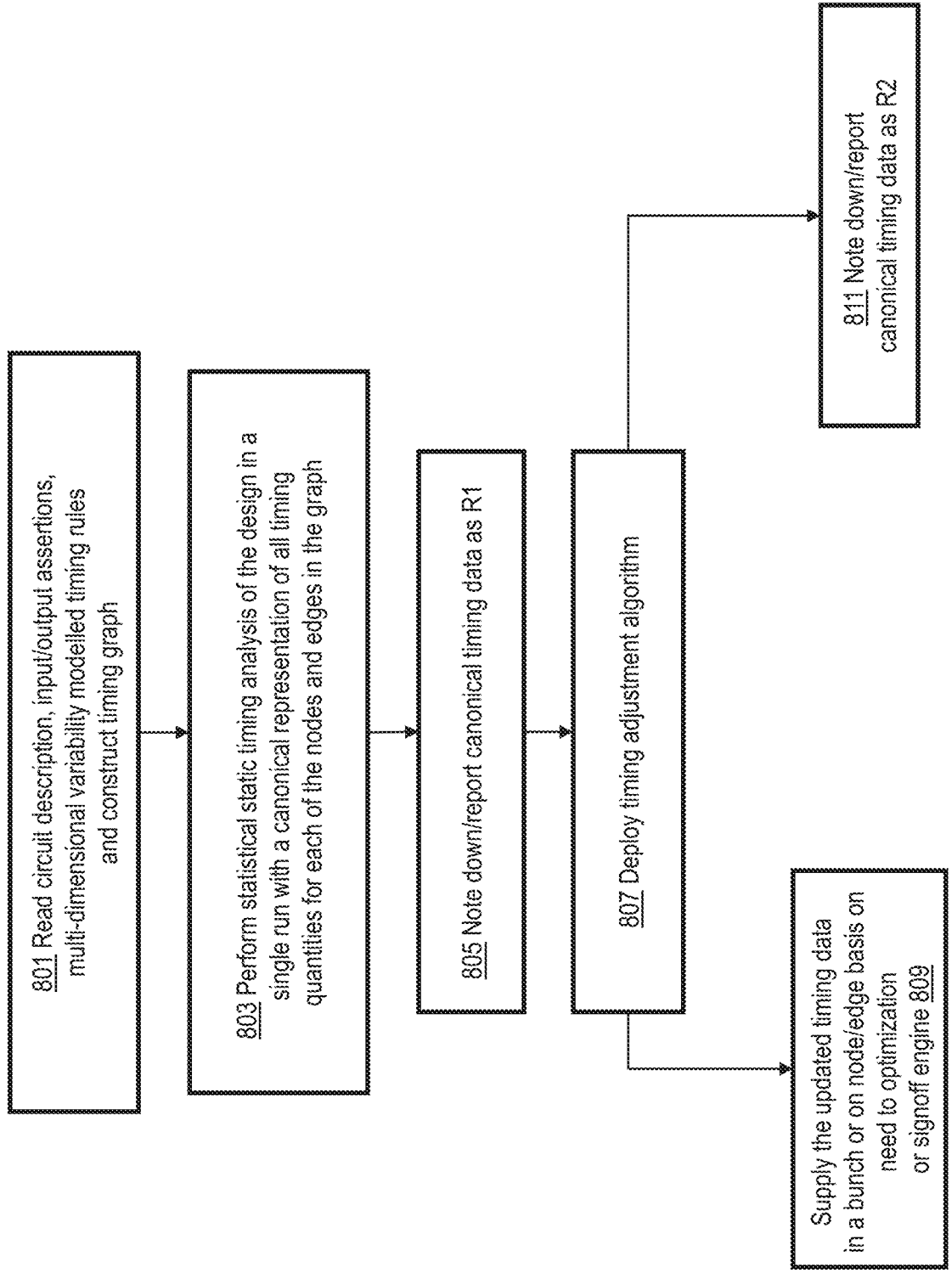
FIG. 8 is a flow chart showing how one or more embodiments fit into timing engine processes.

FIG. 8 shows how an exemplary algorithm according to aspects of the invention fits in at the timing engine level. In step 801, read the circuit description, input/output assertions, and multi-dimensional variability modelled timing rules, and construct the timing graph. In step 803, perform a statistical static timing analysis of the design in a single run, with a canonical representation of all timing quantities for each of the nodes and edges in the graph. In step 805, note down and/or report the canonical timing data as R1 (for example, in an electronic database or other electronic data structure). In step 807, deploy a timing adjustment algorithm as disclosed herein. In step 809, supply the updated timing data in a bunch or on a node/edge basis as needed to an optimization and/or signoff engine. In step 811, note down and/or report the canonical timing data as R2 (for example, in an electronic database or other electronic data structure, which can be the same as or different than that used for R1). Optionally, steps 809 and 811 can be performed in parallel.

One or more embodiments provide a unique way of deriving canonical timing adjustments based on the available underlying timing data in canonical and/or corner form while satisfying specific accuracy requirements which encompass a variety of timing adjustments. Indeed, one or more embodiments create timing adjustments in SSTA while satisfying specific accuracy and functional constraints based on existing deterministic timing adjustment techniques in STA. One or more embodiments provide techniques for deriving efficient projection-based timing adjustment in SSTA. One or more embodiments provide a generic timing adjustment derivation in canonical form technique which applies to a wide variety of adjustments such as CPPR adjust, slack stealing adjust, noise/coupling adjust, cycle time adjust and so forth. One or more instances provide a method of timing adjustment including retrieving rules and input design data for an EDA design; selecting timing edge(s) for adjustment; computing a deterministic adjustment in each projection corner; reverse engineering a final adjustment based on the deterministic adjustment; and applying the final adjustment to the design and propagating the adjustment through the EDA design.

Given the discussion thus far, it will be appreciated that an exemplary method for increasing the efficiency of electronic design automation, according to an aspect of the invention, includes, as per step 104 (first pass) building, as an electronic data structure, a timing graph characterizing a putative integrated circuit design. A further step includes, as per step 106, identifying at least one of an edge and a node in the timing graph that requires canonical timing adjustment (such identification can be carried out, for example, based on test points in the design, latches, victim nets, subblock ports, and the like—indeed, given the teachings herein, the skilled artisan will be able to carry out the identification using prior art techniques known to the deterministic algorithm). A still further step includes electronically calculating a deterministic timing adjustment for each of a plurality of corner cases, as per step 108 (it is worth noting that practical applications typically have two or more corner cases, but theoretically, one or more embodiments can be used for one corner definition as well. i.e. the derived canonical adjust would have a "mean" only component). An even further step 110 includes, based on the calculated deterministic timing adjustment for each of the plurality of corner cases, determining the canonical timing adjustment for the at least one of an edge and a node. Another step 112 includes applying the canonical timing adjustment to the timing graph. Still another step includes (e.g. repeated step 104) updating the timing graph based on the application of the canonical timing adjustment. Yet another step, which is optional, includes repeating the identifying, calculating, determining, and applying steps at least once (e.g. until decision block 114 yields a "NO"). Furthermore in this regard, some algorithms are iterative and involve repetition; however, aspects of the invention but can also be employed with non-iterative algorithms without repetition. In addition, the skilled artisan will appreciate that building the timing graph typically involves, as per step 102, obtaining, as electronic data, inputs characterizing the putative integrated circuit design, such as the netlist, rules and input design data; the building is then typically based on such inputs.

Thus, some embodiments further include step 102, obtaining, as electronic data, inputs characterizing the putative integrated circuit design; the building of step 104 is then based on the inputs.

As an aside, it should be noted that one or more embodiments increase the efficiency of EDA, increase the performance of the computer that implements the EDA, increase the performance of the chips designed with the EDA, and/or improve chip yield because of accurate canonical timing adjustment.

In one or more instances, the determining step 110 includes identifying a set D of input timing data required to compute the canonical timing adjustment; identifying a set U of unknowns in a canonical equation; plugging the calculated deterministic timing adjustments for each of the plurality of corner cases into the canonical equation; and solving for the set of unknowns to determine the canonical equation (see above discussion of reverse engineering). The canonical timing adjustment is calculated in accordance with the canonical equation.

Referring, for example, to FIGS. 2-4 and accompanying text, some embodiments can be applied to a slack stealing engine (SSE). In such cases, for example, the at least one of an edge and a node includes at least one transparent latch; and the applying of the adjustment includes, for the at least one transparent latch, adjusting an input canonical required arrival time and an output canonical arrival time. In one or more embodiments, the timing graph per se is not updated physically; nonetheless, in one or more embodiments, only the timing quantities are adjusted around the latch.

Some embodiments can be applied to canonical clocks; in such cases, the canonical adjustment is based on clock values associated with the corner cases. The adjust gets applied in the setup/hold test slack computation.

Referring, for example, to FIGS. 5-6 and accompanying text, some embodiments can be applied to noise adjustment. In such cases, for example, the calculating of the deterministic timing adjustment includes calculating combined noise for each of a plurality of aggressor nets; and converting the combined noise into at least one of a delay adjustment and a slew adjustment for each of the corner cases. In one or more embodiments, delay/slew adjustment is undertaken, with no physical updates to the timing graph. In general, a "timing graph update" refers to updating all the pending physical and/or timing attributes. Updating a timing graph also comes into play if any design optimization is performed based on one round of timing adjustment, so before the next round of timing adjustment computation, graph update is undertaken.

Some embodiments can be applied to assertion generation for sub-blocks; in such cases, the corner cases include assertions for at least one port of at least one sub-block of the putative integrated circuit design. The generated canonical port assertions are sent as input to the standalone timing analysis of such sub-block.

In some instances, at least one of the canonical timing adjustment and the deterministic timing adjustment is derived separately for each data rise and data fall.

In some embodiments, at least one of the canonical timing adjustment and the deterministic timing adjustment is derived on a per phase basis.

In some embodiments, at least one of the canonical timing adjustment and the deterministic timing adjustment is derived separately for early mode and late mode.

In one or more embodiments, at least one of the canonical timing adjustment and the deterministic timing adjustment is derived on per path basis.

One or more embodiments further include making at least one design change to the putative circuit design based on the updating of the timing graph.

One or more embodiments include updating the putative circuit design to reflect the at least one design change; and fabricating a physical integrated circuit in accordance with the updated circuit design.

Figure 10:
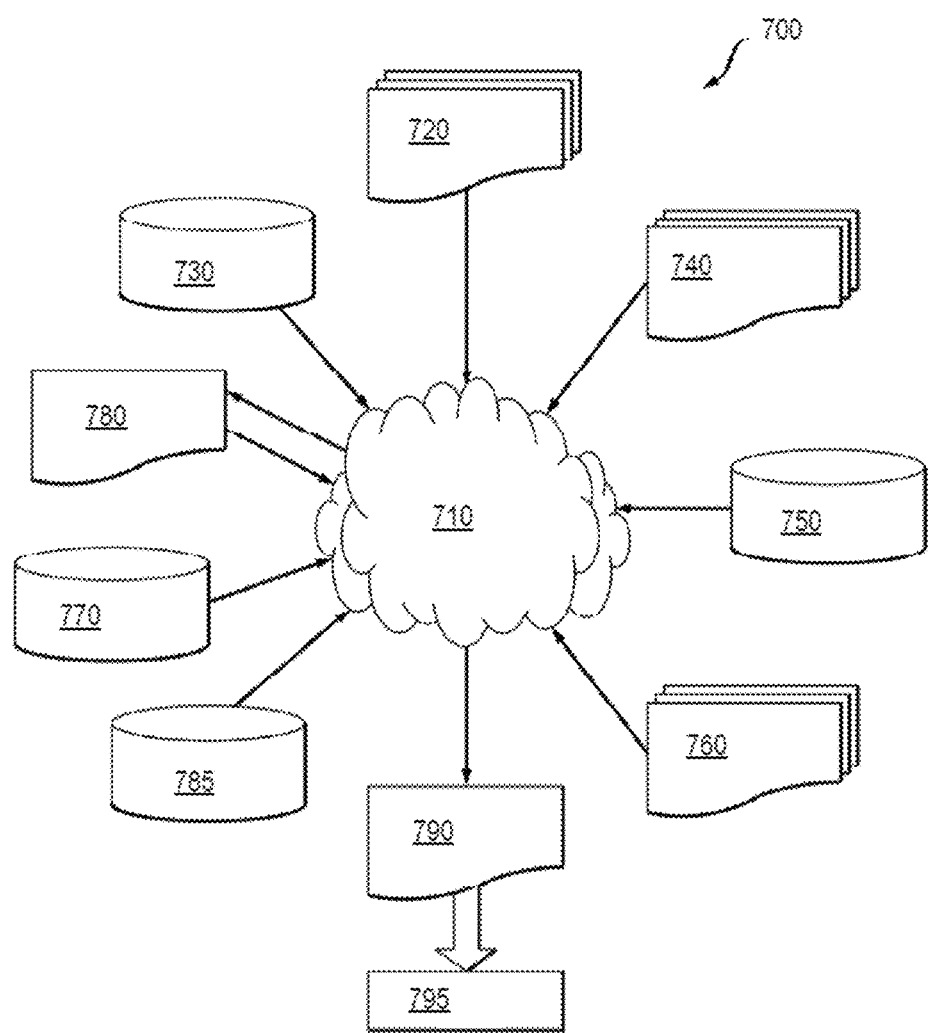
FIG. 10 is a flow diagram of a design process used in semiconductor design, manufacture, and/or test.
Figure 11:
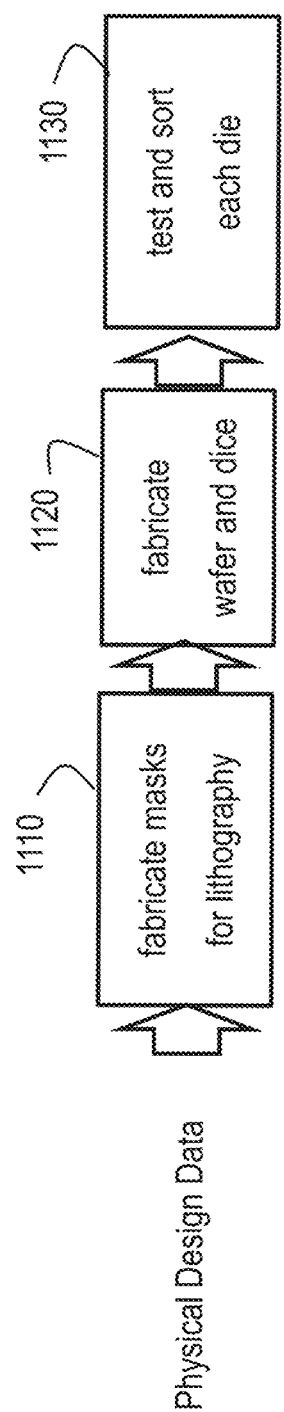
FIG. 11 shows further aspects of IC fabrication from physical design data.
Figure 12:
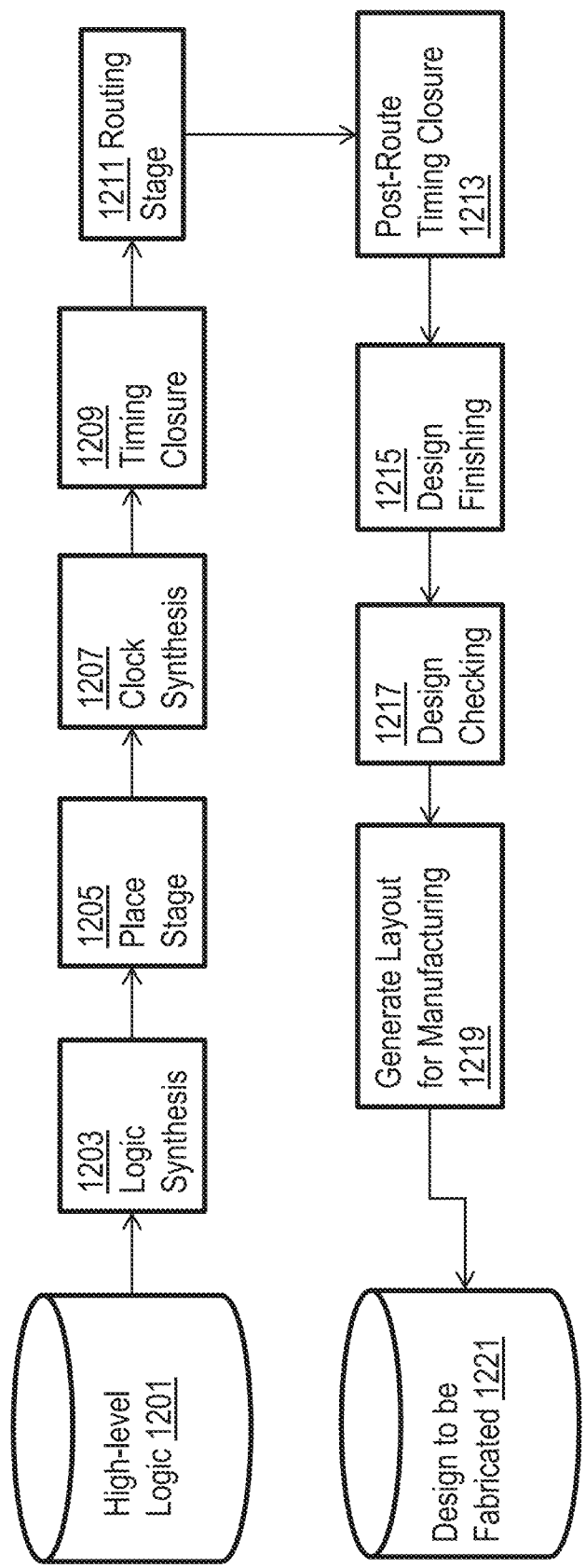
FIG. 12 shows an exemplary high-level Electronic Design Automation (EDA) tool flow, within which aspects of the invention can be employed.

For example, referring to FIGS. 10-12 discussed elsewhere herein, render the updated circuit design in a design language; and prepare a layout based on the updated circuit design rendered in the design language. Instantiate the layout as a design structure. The physical integrated circuit is then fabricated in accordance with the design structure.

Accordingly, in one or more embodiments, the layout is instantiated as a design structure. See discussion of FIG. 10. A physical integrated circuit is then fabricated in accordance with the design structure. See again discussion of FIG. 10. Refer also to FIG. 11. Once the physical design data is obtained, based, in part, on the analytical processes described herein, an integrated circuit designed in accordance therewith can be fabricated according to known processes that are generally described with reference to FIG. 11. Generally, a wafer with multiple copies of the final design is fabricated and cut (i.e., diced) such that each die is one copy of the integrated circuit. At block 1110, the processes include fabricating masks for lithography based on the finalized physical layout. At block 1120, fabricating the wafer includes using the masks to perform photolithography and etching. Once the wafer is diced, testing and sorting each die is performed at 1130 to filter out any faulty die.

Figure 9:
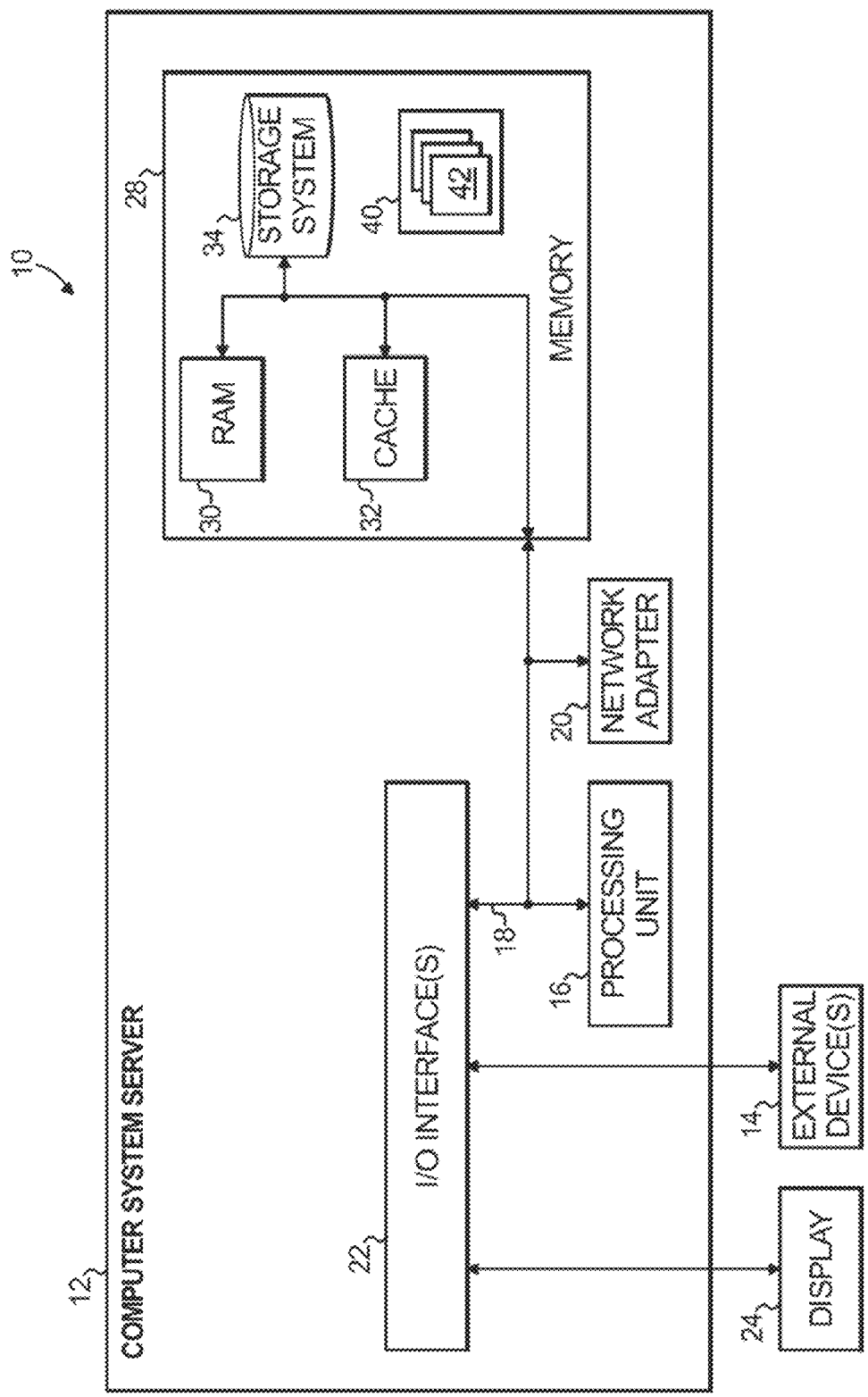
FIG. 9 depicts a computer system that may be useful in implementing one or more aspects and/or elements of the invention.

One or more embodiments include a computer including a memory 28; and at least one processor 16, coupled to the memory, and operative to carry out or otherwise facilitate any one, some, or all of the method steps described herein (as depicted in FIG. 9). In one or more embodiments, the performance (speed) of this computer is improved, for example, by more efficient performance of projection-based timing adjustments in static timing analysis (STA) and/or more efficient model storage. Accordingly, the amount of computer resources/CPU time needed during the design cycle, as well as the amount of human design engineer hours, can be reduced using aspects of the invention. Alternatively, with the same resources and design engineer hours, a different and better (in terms of power/performance and the like) chip can be designed.

Furthermore, referring to FIG. 10, in one or more embodiments the at least one processor is operative to generate a design structure for the circuit design in accordance with the analysis, and in at least some embodiments, the at least one processor is further operative to control integrated circuit manufacturing equipment to fabricate a physical integrated circuit in accordance with the design structure. Thus, the layout can be instantiated as a design structure, and the design structure can be provided to fabrication equipment to facilitate fabrication of a physical integrated circuit in accordance with the design structure. The physical integrated circuit will be improved (for example, because of enhanced timing performance and/or reduced power consumption, as compared to designs not using aspects of the invention for EDA. Furthermore, a better chip yield is obtained in one or more embodiments because of accurate canonical timing adjustment.

FIG. 12 depicts an example high-level Electronic Design Automation (EDA) tool flow, which is responsible for creating an optimized microprocessor (or other IC) design to be manufactured. A designer could start with a high-level logic description 1201 of the circuit (e.g. VHDL or Verilog). The logic synthesis tool 1203 compiles the logic, and optimizes it without any sense of its physical representation, and with estimated timing information. The placement tool 1205 takes the logical description and places each component, looking to minimize congestion in each area of the design. The clock synthesis tool 1207 optimizes the clock tree network by cloning/balancing/buffering the latches or registers. The timing closure step 1209 performs a number of optimizations on the design, including buffering, wire tuning, and circuit repowering; its goal is to produce a design which is routable, without timing violations, and without excess power consumption. The routing stage 1211 takes the placed/optimized design, and determines how to create wires to connect all of the components, without causing manufacturing violations. Post-route timing closure 1213 performs another set of optimizations to resolve any violations that are remaining after the routing. Design finishing 1215 then adds extra metal shapes to the netlist, to conform with manufacturing requirements. The checking steps 1217 analyze whether the design is violating any requirements such as manufacturing, timing, power, electromigration (e.g., using techniques disclosed herein) or noise. When the design is clean, the final step 1219 is to generate a layout for the design, representing all the shapes to be fabricated in the design to be fabricated 1221.

One or more embodiments of the invention, or elements thereof, can be implemented in the form of an apparatus including a memory and at least one processor that is coupled to the memory and operative to perform exemplary method steps. FIG. 9 depicts a computer system that may be useful in implementing one or more aspects and/or elements of the invention; it is referred to herein as a cloud computing node but is also representative of a server, general purpose-computer, etc. which may be provided in a cloud or locally.

In cloud computing node 10 there is a computer system/server 12, which is operational with numerous other general purpose or special purpose computing system environments or configurations. Examples of well-known computing systems, environments, and/or configurations that may be suitable for use with computer system/server 12 include, but are not limited to, personal computer systems, server computer systems, thin clients, thick clients, handheld or laptop devices, multiprocessor systems, microprocessor-based systems, set top boxes, programmable consumer electronics, network PCs, minicomputer systems, mainframe computer systems, and distributed cloud computing environments that include any of the above systems or devices, and the like.

Computer system/server 12 may be described in the general context of computer system executable instructions, such as program modules, being executed by a computer system. Generally, program modules may include routines, programs, objects, components, logic, data structures, and so on that perform particular tasks or implement particular abstract data types. Computer system/server 12 may be practiced in distributed cloud computing environments where tasks are performed by remote processing devices that are linked through a communications network. In a distributed cloud computing environment, program modules may be located in both local and remote computer system storage media including memory storage devices.

As shown in FIG. 9, computer system/server 12 in cloud computing node 10 is shown in the form of a general-purpose computing device. The components of computer system/server 12 may include, but are not limited to, one or more processors or processing units 16, a system memory 28, and a bus 18 that couples various system components including system memory 28 to processor 16.

Bus 18 represents one or more of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnect (PCI) bus.

Computer system/server 12 typically includes a variety of computer system readable media. Such media may be any available media that is accessible by computer system/server 12, and it includes both volatile and non-volatile media, removable and non-removable media.

System memory 28 can include computer system readable media in the form of volatile memory, such as random access memory (RAM) 30 and/or cache memory 32. Computer system/server 12 may further include other removable/non-removable, volatile/non-volatile computer system storage media. By way of example only, storage system 34 can be provided for reading from and writing to a non-removable, non-volatile magnetic media (not shown and typically called a "hard drive"). Although not shown, a magnetic disk drive for reading from and writing to a removable, non-volatile magnetic disk (e.g., a "floppy disk"), and an optical disk drive for reading from or writing to a removable, non-volatile optical disk such as a CD-ROM, DVD-ROM or other optical media can be provided. In such instances, each can be connected to bus 18 by one or more data media interfaces. As will be further depicted and described below, memory 28 may include at least one program product having a set (e.g., at least one) of program modules that are configured to carry out the functions of embodiments of the invention.

Program/utility 40, having a set (at least one) of program modules 42, may be stored in memory 28 by way of example, and not limitation, as well as an operating system, one or more application programs, other program modules, and program data. Each of the operating system, one or more application programs, other program modules, and program data or some combination thereof, may include an implementation of a networking environment. Program modules 42 generally carry out the functions and/or methodologies of embodiments of the invention as described herein.

Computer system/server 12 may also communicate with one or more external devices 14 such as a keyboard, a pointing device, a display 24, etc.; one or more devices that enable a user to interact with computer system/server 12; and/or any devices (e.g., network card, modem, etc.) that enable computer system/server 12 to communicate with one or more other computing devices. Such communication can occur via Input/Output (I/O) interfaces 22. Still yet, computer system/server 12 can communicate with one or more networks such as a local area network (LAN), a general wide area network (WAN), and/or a public network (e.g., the Internet) via network adapter 20. As depicted, network adapter 20 communicates with the other components of computer system/server 12 via bus 18. It should be understood that although not shown, other hardware and/or software components could be used in conjunction with computer system/server 12. Examples, include, but are not limited to: microcode, device drivers, redundant processing units, and external disk drive arrays, RAID systems, tape drives, and data archival storage systems, etc.

Thus, one or more embodiments can make use of software running on a general purpose computer or workstation. With reference to FIG. 9, such an implementation might employ, for example, a processor 16, a memory 28, and an input/output interface 22 to a display 24 and external device(s) 14 such as a keyboard, a pointing device, or the like. The term "processor" as used herein is intended to include any processing device, such as, for example, one that includes a CPU (central processing unit) and/or other forms of processing circuitry. Further, the term "processor" may refer to more than one individual processor. The term "memory" is intended to include memory associated with a processor or CPU, such as, for example, RAM (random access memory) 30, ROM (read only memory), a fixed memory device (for example, hard drive 34), a removable memory device (for example, diskette), a flash memory and the like. In addition, the phrase "input/output interface" as used herein, is intended to contemplate an interface to, for example, one or more mechanisms for inputting data to the processing unit (for example, mouse), and one or more mechanisms for providing results associated with the processing unit (for example, printer). The processor 16, memory 28, and input/output interface 22 can be interconnected, for example, via bus 18 as part of a data processing unit 12. Suitable interconnections, for example via bus 18, can also be provided to a network interface 20, such as a network card, which can be provided to interface with a computer network, and to a media interface, such as a diskette or CD-ROM drive, which can be provided to interface with suitable media.

Accordingly, computer software including instructions or code for performing the methodologies of the invention, as described herein, may be stored in one or more of the associated memory devices (for example, ROM, fixed or removable memory) and, when ready to be utilized, loaded in part or in whole (for example, into RAM) and implemented by a CPU. Such software could include, but is not limited to, firmware, resident software, microcode, and the like.

A data processing system suitable for storing and/or executing program code will include at least one processor 16 coupled directly or indirectly to memory elements 28 through a system bus 18. The memory elements can include local memory employed during actual implementation of the program code, bulk storage, and cache memories 32 which provide temporary storage of at least some program code in order to reduce the number of times code must be retrieved from bulk storage during implementation.

Input/output or I/O devices (including but not limited to keyboards, displays, pointing devices, and the like) can be coupled to the system either directly or through intervening I/O controllers.

Network adapters 20 may also be coupled to the system to enable the data processing system to become coupled to other data processing systems or remote printers or storage devices through intervening private or public networks. Modems, cable modem and Ethernet cards are just a few of the currently available types of network adapters.

As used herein, including the claims, a "server" includes a physical data processing system (for example, system 12 as shown in FIG. 9) running a server program. It will be understood that such a physical server may or may not include a display and keyboard.

It should be noted that any of the methods described herein can include an additional step of providing a system comprising distinct software modules embodied on a computer readable storage medium; the modules can include, for example, any or all of the appropriate elements depicted in the block diagrams and/or described herein; by way of example and not limitation, any one, some or all of the modules/blocks and or sub-modules/sub-blocks described. The method steps can then be carried out using the distinct software modules and/or sub-modules of the system, as described above, executing on one or more hardware processors such as 16. Further, a computer program product can include a computer-readable storage medium with code adapted to be implemented to carry out one or more method steps described herein, including the provision of the system with the distinct software modules.

One example of user interface that could be employed in some cases is hypertext markup language (HTML) code served out by a server or the like, to a browser of a computing device of a user. The HTML is parsed by the browser on the user's computing device to create a graphical user interface (GUI).

Exemplary System and Article of Manufacture Details

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

Exemplary Design Process Used in Semiconductor Design, Manufacture, and/or Test

One or more embodiments integrate the characterizing and simulating techniques herein with semiconductor integrated circuit design simulation, test, layout, and/or manufacture. In this regard, FIG. 10 shows a block diagram of an exemplary design flow 700 used for example, in semiconductor IC logic design, simulation, test, layout, and manufacture. Design flow 700 includes processes, machines and/or mechanisms for processing design structures or devices to generate logically or otherwise functionally equivalent representations of design structures and/or devices, such as those that can be analyzed using techniques disclosed herein or the like. The design structures processed and/or generated by design flow 700 may be encoded on machine-readable storage media to include data and/or instructions that when executed or otherwise processed on a data processing system generate a logically, structurally, mechanically, or otherwise functionally equivalent representation of hardware components, circuits, devices, or systems. Machines include, but are not limited to, any machine used in an IC design process, such as designing, manufacturing, or simulating a circuit, component, device, or system. For example, machines may include: lithography machines, machines and/or equipment for generating masks (e.g. e-beam writers), computers or equipment for simulating design structures, any apparatus used in the manufacturing or test process, or any machines for programming functionally equivalent representations of the design structures into any medium (e.g. a machine for programming a programmable gate array).

Design flow 700 may vary depending on the type of representation being designed. For example, a design flow 700 for building an application specific IC (ASIC) may differ from a design flow 700 for designing a standard component or from a design flow 700 for instantiating the design into a programmable array, for example a programmable gate array (PGA) or a field programmable gate array (FPGA) offered by Altera® Inc. or Xilinx® Inc.

FIG. 10 illustrates multiple such design structures including an input design structure 720 that is preferably processed by a design process 710. Design structure 720 may be a logical simulation design structure generated and processed by design process 710 to produce a logically equivalent functional representation of a hardware device. Design structure 720 may also or alternatively comprise data and/or program instructions that when processed by design process 710, generate a functional representation of the physical structure of a hardware device. Whether representing functional and/or structural design features, design structure 720 may be generated using electronic computer-aided design (ECAD) such as implemented by a core developer/designer. When encoded on a gate array or storage medium or the like, design structure 720 may be accessed and processed by one or more hardware and/or software modules within design process 710 to simulate or otherwise functionally represent an electronic component, circuit, electronic or logic module, apparatus, device, or system. As such, design structure 720 may comprise files or other data structures including human and/or machine-readable source code, compiled structures, and computer executable code structures that when processed by a design or simulation data processing system, functionally simulate or otherwise represent circuits or other levels of hardware logic design. Such data structures may include hardware-description language (HDL) design entities or other data structures conforming to and/or compatible with lower-level HDL design languages such as Verilog and VHDL, and/or higher level design languages such as C or C++.

Design process 710 preferably employs and incorporates hardware and/or software modules for synthesizing, translating, or otherwise processing a design/simulation functional equivalent of components, circuits, devices, or logic structures to generate a Netlist 780 which may contain design structures such as design structure 720. Netlist 780 may comprise, for example, compiled or otherwise processed data structures representing a list of wires, discrete components, logic gates, control circuits, I/O devices, models, etc. that describes the connections to other elements and circuits in an integrated circuit design. Netlist 780 may be synthesized using an iterative process in which netlist 780 is resynthesized one or more times depending on design specifications and parameters for the device. As with other design structure types described herein, netlist 780 may be recorded on a machine-readable data storage medium or programmed into a programmable gate array. The medium may be a nonvolatile storage medium such as a magnetic or optical disk drive, a programmable gate array, a compact flash, or other flash memory. Additionally, or in the alternative, the medium may be a system or cache memory, buffer space, or other suitable memory.

Design process 710 may include hardware and software modules for processing a variety of input data structure types including Netlist 780. Such data structure types may reside, for example, within library elements 730 and include a set of commonly used elements, circuits, and devices, including models, layouts, and symbolic representations, for a given manufacturing technology (e.g., different technology nodes, 32 nm, 45 nm, 90 nm, etc.). The data structure types may further include design specifications 740, characterization data 750, verification data 760, design rules 770, and test data files 785 which may include input test patterns, output test results, and other testing information. Design process 710 may further include, for example, standard mechanical design processes such as stress analysis, thermal analysis, mechanical event simulation, process simulation for operations such as casting, molding, and die press forming, etc. One of ordinary skill in the art of mechanical design can appreciate the extent of possible mechanical design tools and applications used in design process 710 without deviating from the scope and spirit of the invention. Design process 710 may also include modules for performing standard circuit design processes such as timing analysis, verification, design rule checking, place and route operations, etc. Improved latch tree synthesis can be performed as described herein.

Design process 710 employs and incorporates logic and physical design tools such as HDL compilers and simulation model build tools to process design structure 720 together with some or all of the depicted supporting data structures along with any additional mechanical design or data (if applicable), to generate a second design structure 790. Design structure 790 resides on a storage medium or programmable gate array in a data format used for the exchange of data of mechanical devices and structures (e.g. information stored in an IGES, DXF, Parasolid XT, JT, DRG, or any other suitable format for storing or rendering such mechanical design structures). Similar to design structure 720, design structure 790 preferably comprises one or more files, data structures, or other computer-encoded data or instructions that reside on data storage media and that when processed by an ECAD system generate a logically or otherwise functionally equivalent form of one or more IC designs or the like. In one embodiment, design structure 790 may comprise a compiled, executable HDL simulation model that functionally simulates the devices to be analyzed.

Design structure 790 may also employ a data format used for the exchange of layout data of integrated circuits and/or symbolic data format (e.g. information stored in a GDSII (GDS2), GL1, OASIS, map files, or any other suitable format for storing such design data structures). Design structure 790 may comprise information such as, for example, symbolic data, map files, test data files, design content files, manufacturing data, layout parameters, wires, levels of metal, vias, shapes, data for routing through the manufacturing line, and any other data required by a manufacturer or other designer/developer to produce a device or structure as described herein (e.g., .lib files). Design structure 790 may then proceed to a stage 795 where, for example, design structure 790: proceeds to tape-out, is released to manufacturing, is released to a mask house, is sent to another design house, is sent back to the customer, etc.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A method for increasing efficiency of electronic design automation, the method comprising:
   building, as an electronic data structure, a timing graph characterizing a putative integrated circuit design;
   identifying at least one of an edge and a node in said timing graph that requires canonical timing adjustment;
   electronically calculating a deterministic timing adjustment for each of a plurality of corner cases;
   based on said calculated deterministic timing adjustment for each of said plurality of corner cases, determining said canonical timing adjustment for said at least one of an edge and a node, wherein said determining comprises identifying a set of input timing data required to compute said canonical timing adjustment, identifying a set of unknowns in a canonical equation, plugging said calculated deterministic timing adjustments for each of said plurality of corner cases into said canonical equation, and solving for said set of unknowns to determine said canonical equation, wherein said canonical timing adjustment is calculated in accordance with said canonical equation;
   applying said canonical timing adjustment to said timing graph;
   updating said timing graph based on said application of said canonical timing adjustment;
   making at least one design change to said putative circuit design based on said updating of said timing graph;
   updating said putative circuit design to reflect said at least one design change; and
   fabricating a physical integrated circuit in accordance with said updated putative circuit design.

2. The method of claim 1, further comprising repeating said identifying, calculating, determining, and applying steps at least once.

3. The method of claim 2, wherein:
   said at least one of an edge and a node comprises at least one transparent latch; and
   said applying of said adjustment comprises, for said at least one transparent latch, adjusting an input canonical required arrival time and an output canonical arrival time.

4. The method of claim 2, wherein said canonical adjustment is based on clock values associated with said corner cases.

5. The method of claim 2, wherein:
   said calculating of said deterministic timing adjustment comprises calculating combined noise for each of a plurality of aggressor nets; and converting said combined noise into at least one of a delay adjustment and a slew adjustment for each of said corner cases.

6. The method of claim 2, wherein said corner cases comprise assertions for at least one port of at least one sub-block of said putative integrated circuit design.

7. The method of claim 1, further comprising:
rendering said updated putative circuit design in a design language;
preparing a layout based on said updated putative circuit design rendered in said design language; and
instantiating said layout as a design structure;
wherein said physical integrated circuit is fabricated in accordance with said design structure.

8. A computer comprising:
a memory; and
at least one processor, coupled to said memory, and operative to increase efficiency of electronic design automation by:
building, as an electronic data structure in said memory, a timing graph characterizing a putative integrated circuit design;
identifying at least one of an edge and a node in said timing graph that requires canonical timing adjustment;
calculating a deterministic timing adjustment for each of a plurality of corner cases;
based on said calculated deterministic timing adjustment for each of said plurality of corner cases, determining said canonical timing adjustment for said at least one of an edge and a node, wherein said determining comprises identifying a set of input timing data required to compute said canonical timing adjustment, identifying a set of unknowns in a canonical equation, plugging said calculated deterministic timing adjustments for each of said plurality of corner cases into said canonical equation, and solving for said set of unknowns to determine said canonical equation, wherein said canonical timing adjustment is calculated in accordance with said canonical equation;
applying said canonical timing adjustment to said timing graph;
updating said timing graph based on said application of said canonical timing adjustment;
making at least one design change to said putative circuit design based on said updating of said timing graph;
updating said putative circuit design to reflect said at least one design change; and
fabricating a physical integrated circuit in accordance with said updated putative circuit design.

9. The computer of claim 8, wherein said at least one processor is further operative to repeat said identifying, calculating, determining, and applying at least once.

10. The computer of claim 9, wherein said at least one processor is further operative to increase the efficiency of the electronic design automation by:
rendering said updated putative circuit design in a design language;
preparing a layout based on said updated putative circuit design rendered in said design language;
instantiating said layout as a design structure; and
providing said design structure to fabrication equipment to facilitate fabrication of said physical integrated circuit in accordance with said design structure.

11. The computer of claim 9, wherein:
said at least one of an edge and a node comprises at least one transparent latch; and
said at least one processor is operative to apply said adjustment by, for said at least one transparent latch, adjusting an input canonical required arrival time and an output canonical arrival time.

12. A non-transitory computer readable medium comprising computer executable instructions which when executed by a computer performing electronic design automation cause the computer to perform a method which increases efficiency of the electronic design automation, the method comprising:
building, as an electronic data structure, a timing graph characterizing a putative integrated circuit design;
identifying at least one of an edge and a node in said timing graph that requires canonical timing adjustment;
calculating a deterministic timing adjustment for each of a plurality of corner cases;
based on said calculated deterministic timing adjustment for each of said plurality of corner cases, determining said canonical timing adjustment for said at least one of an edge and a node, wherein said determining comprises identifying a set of input timing data required to compute said canonical timing adjustment, identifying a set of unknowns in a canonical equation, plugging said calculated deterministic timing adjustments for each of said plurality of corner cases into said canonical equation, and solving for said set of unknowns to determine said canonical equation, wherein said canonical timing adjustment is calculated in accordance with said canonical equation;
applying said canonical timing adjustment to said timing graph;
updating said timing graph based on said application of said canonical timing adjustment;
making at least one design change to said putative circuit design based on said updating of said timing graph;
updating said putative circuit design to reflect said at least one design change; and
fabricating a physical integrated circuit in accordance with said updated putative circuit design.

13. The non-transitory computer readable medium of claim 12, wherein said method further comprises repeating said identifying, calculating, determining, and applying at least once.

14. The non-transitory computer readable medium of claim 13, wherein said method further comprises:
rendering said updated putative circuit design in a design language;
preparing a layout based on said updated putative circuit design rendered in said design language;
instantiating said layout as a design structure; and
providing said design structure to fabrication equipment to facilitate fabrication of said physical integrated circuit in accordance with said design structure.

15. The non-transitory computer readable medium of claim 13, wherein:
said at least one of an edge and a node comprises at least one transparent latch; and
in said method, said applying of said adjustment comprises, for said at least one transparent latch, adjusting an input canonical required arrival time and an output canonical arrival time.

* * * * *